United States Patent
Muller

[15] 3,667,476
[45] June 6, 1972

[54] APPARATUS FOR MONITORING BODY TEMPERATURE AND CONTROLLING A HEATING DEVICE TO MAINTAIN A SELECTED TEMPERATURE

[72] Inventor: Henry Muller, Hatboro, Pa.
[73] Assignee: Bio/Data Corporation, Norristown, Pa.
[22] Filed: Apr. 27, 1970
[21] Appl. No.: 31,920

[52] U.S. Cl. ............................128/399, 219/494, 219/504, 340/228, 340/233
[51] Int. Cl. ............................................................A61b 6/10
[58] Field of Search ................................128/2 R, 399–402; 219/491, 494, 504, 505; 73/362 AR, 362 SC; 236/3; 337/332; 340/228, 233

[56] References Cited

UNITED STATES PATENTS

| | | | |
|---|---|---|---|
| 3,074,410 | 1/1963 | Foster | 128/400 |
| 3,274,994 | 9/1966 | Sturm | 128/2 R |
| 3,363,087 | 1/1968 | Buxbaum et al. | 128/399 X |

*Primary Examiner*—William E. Kamm
*Attorney*—Seidel, Gonda & Goldhammer

[57] ABSTRACT

A servocircuit measures and controls temperature. A thermistor detects temperature and a controller controls a heating device to maintain a selected temperature in a living organism. The danger of electric shock is removed by using field effect transistors to isolate the thermistor from hazardous voltage currents. Alarm and control circuitry eliminates danger of overheating.

7 Claims, 3 Drawing Figures

INVENTOR.
HENRY MULLER
BY
Seidel, Gonda & Goldhammer
ATTORNEYS.

INVENTOR
HENRY MULLER
BY
Seidel, Gonda & Goldhammer
ATTORNEYS.

APPARATUS FOR MONITORING BODY TEMPERATURE AND CONTROLLING A HEATING DEVICE TO MAINTAIN A SELECTED TEMPERATURE

This invention relates to apparatus for monitoring in vivo temperature and controlling a heater in response thereto. More particularly, this invention relates to an electronic servo-circuit for measuring, controlling and monitoring human body temperature.

There are a number of medical and scientific procedures which require the application of heat to a living organism. In particular, it is often desirable to apply heat to a human body under controlled conditions. In accordance with the present invention apparatus in the form of electronic circuitry is provided for measuring and controlling the application of heat to a living organism. The particular application of this invention is for the measurement and control of the amount of heat applied to a human body. However, those skilled in the art will readily recognize that it has application to all types of living organisms.

In accordance with the present invention, the temperature of the organism is measured with a temperature sensitive device, such as a thermistor, and the output of that device is used to control one or more heating devices so that the temperature of the organism is maintained at a preselected level. Among the features of the present invention is the incorporation of a number of safety and warning devices which protect the organism against electric shock and overheating. In particular, the temperature sensitive device used with the present invention is electronically isolated from other parts of the circuit so that it may be operated at voltages that are not hazardous in he organism. Still another feature of the present invention is the incorporation of circuitry to avoid the hazard of a breakdown in the operation of the thermistor itself. In particular, both short circuit and open circuit protection are incorporated into the circuit. Short circuit protection is inherent in the design of the control mechanism. Special circuitry for protecting against open circuits has also been provided. This latter circuitry avoids the danger that the heater control, when driven into a condition where it falsely senses a "cold" measurement at the sensing device, will respond by overheating the organism.

Still another feature of the present invention is the provision of an alarm which signals a variation away from a preset temperature. This alarm is designed to signal in response to absolute deviations in temperature. Thus, it is responsive to both high and low temperature deviations.

Other features of this invention will appear hereinafter.

Briefly, the present invention incorporates apparatus for detecting temperature in vivo and controlling a heater in response to the detected temperature. The apparatus incorporates a temperature sensitive device that is connected in one leg of a bridge circuit. The other leg of the bridge circuit balances the bridge and hence provides a temperature selection means. A heater for maintaining the organism at the preselected temperature is controlled by a switch which turns it on or off. The switch in turn is operated by control circuitry that is responsive to temperature changes measured by the bridge. The circuit inherently provides protection against short circuits in temperature sensing means. A special circuit is provided to sense open circuits in the temperature sensing means and thus avoid overheating the organism. An alarm circuit is also provided to signal either upward or downward deviations in temperature that exceed a predetermined amount.

For the purpose of illustrating the invention, there is shown in the drawings a form which is presently preferred; it being understood, however, that this invention is not limited to the precise arrangements and instrumentalities shown.

Figure 1:
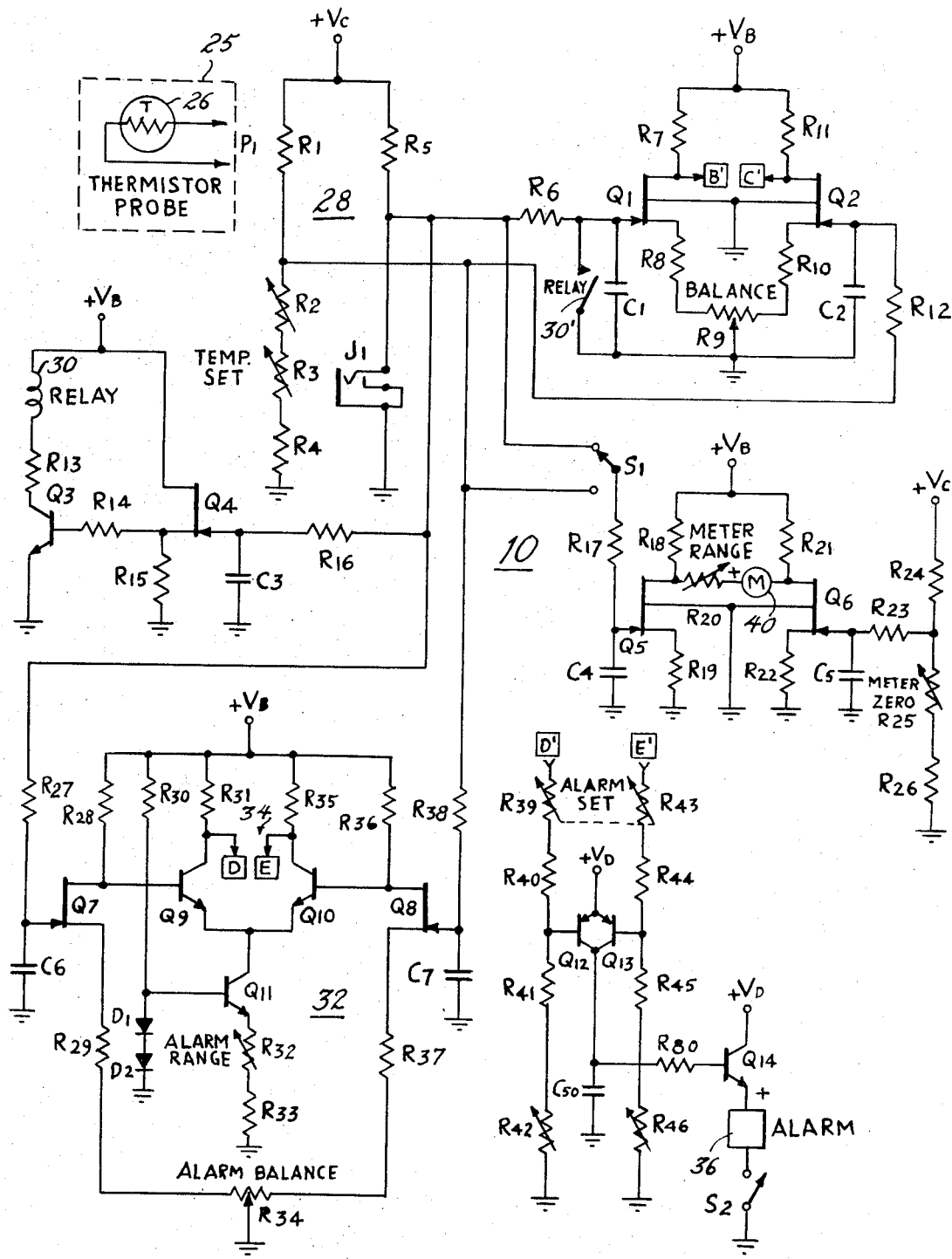
FIG. 1 is a schematic of a measuring and alarm circuit in accordance with the present invention.
Figure 2:
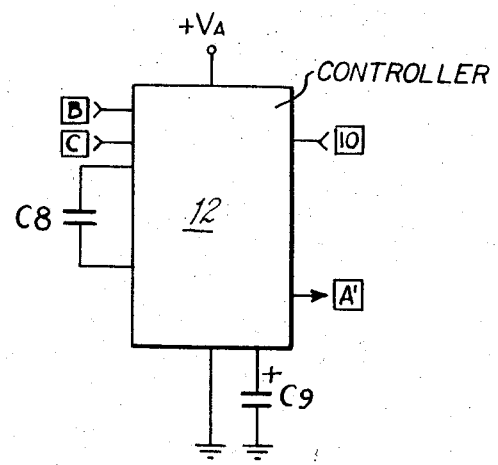
FIG. 2 is a schematic of a detector and driving circuit.
Figure 3:
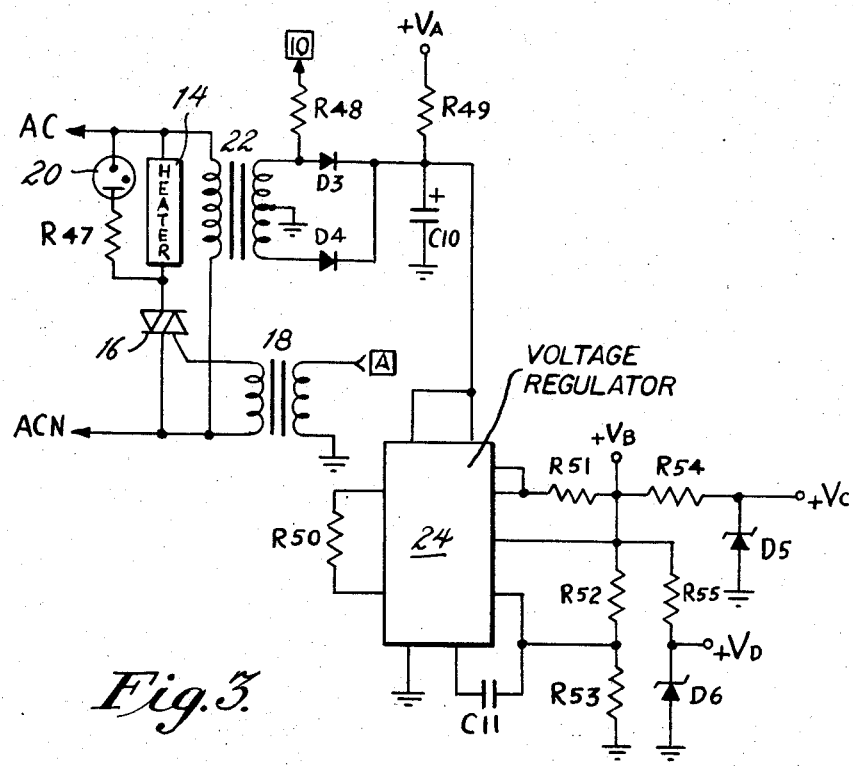
FIG. 3 is a schematic of a heater control and power supply circuit.

Referring now the drawings in detail, wherein like numerals indicate like elements, there is shown in FIG. 1 circuitry for sensing and measuring temperature, as well as circuitry for signalling temperatures deviations, designated generally as 10. FIG. 2 illustrates in block form a device for detecting the temperature measured in FIG. 1 providing trigger control pulses, designated generally as 12. FIG. 3 illustrates in schematic form the heater, a control switch for the heater and a power supply for the remainder of the circuit.

Referring now to FIG. 3, there is shown a heater 14 whose function is to convert electrical energy into heat energy for application to a living organism. Although the heater may be used with respect to any living organism, it is preferably of the type used to maintain body temperature in a human being. It should be understood that the heater 14 may in fact be two or more heating devices applying heat to different parts of the body.

As shown, a symmetrical switch 16 is connected in series with the heater 14 across the source of alternating current power, which may bee commercial power at 120 volts, 60 Hz. The switch 16, which may be referred to as triac switch, is controlled at its gate terminal by gating pulses applied through pulse transformer 18. As indicated, the primary of pulse transformer 18 is connected at terminal A to the output terminal A' of the controller 12.

A neon lamp 20 is connected in series with current limiting resistor R47. Neon lamp 20 serves to indicate when power is being supplied to the heater 14; that is, it indicates when triac switch 16 is conducting current.

The primary of power transformer 22 is connected across a source of alternating current voltage, as shown. The secondary of power transformer 22 is center tapped to ground and diodes D3 and D4 provide full wave rectification to a common cathode junction. Capacitor C10 is connected between the aforesaid junction and ground. This capacitor serves to filter out substantially all of the ripple current in the DC at the junction.

Power for the controller 12 is taken off through resistor R49 as indicated by the symbol $V_A$. Resistor R49 provides the appropriate voltage drop suitable for the trigac controller 12.

Direct current is connected into the supply voltage terminals of a precision voltage regulator 24, which may be a uA723 precision voltage regulator. The output terminals of the voltage regulator 24 are connected through appropriate voltage dropping resistors to provide supply voltages $V_B$, $V_C$, and $V_D$. Zener diodes D5 and D6 provide additional voltage control. The appearance of the symbols $V_B$, $V_C$ and $V_D$ in other portions of the circuit, particularly in FIG. 1, indicate that those terminals are connected to the power supply at the corresponding voltage. In particular, $V_B$ is the supply voltage for the field effect transistors driving the trigac controller 12, the meter and relay circuits, and the differential amplifier, as described in detail hereinafter. $V_C$ provides supply voltage for the bridge circuit described hereinafter; and $V_D$ provides supply voltage for the electronic alarm switch, also described hereinafter. Zener diode D5 is preferably a temperature compensated diode to improve the thermal stability of the bridge circuit. As is explained hereinafter, $V_C$ is chosen to be at a voltage that is sufficiently low to avoid shock hazard to the organism whose temperature is being sensed and maintained.

Referring now to FIG. 1, there is shown a temperature sensing probe 25 which preferably includes a thermistor 26. The probe 25 includes means to affix it to the organism whose temperature is to be measured. Since such means of the fixation form no part of the present invention, it has not been shown. It is sufficient to state that the temperature sensing probe 25 provides the means for directly sensing the temperature of the organism.

The thermistor 26 is connected by the plug P1 into the bridge circuit 28 by means of the jack J1. In one leg of the bridge circuit 28, the resistors R1, R2, R3 and R4 are connected in series between the supply voltage $V_C$ and ground. Resistors R2 and R3 are variable resistances. Variable resistor R2 compensates for the tolerances in the resistance value of the thermistor 26. This tolerance is normally ± 10 percent. Variable resistor R3 is the temperature setting resistor; that is, resistor R3 is preset to provide a control temperature against which all temperatures sensed by the thermistor 26 will be measured. Fixed resistor R4 makes up the difference in the total series resistance of resistors R1, R2 and R3 so that it corresponds with the total resistance of thermistor 26 and resistor R5. Resistors R1, R2, R3 and R4 may be referred to as a temperature selection means or preset control temperature.

Resistor R5 is connected in series with the thermistor 26 between the supply voltage $V_C$ and ground. The value of resistor R5 is equal to the value of resistor R1. Both resistors R1 and R5 have sufficient resistance to maintain the thermistor voltage and current at approximately 1 volt and 1 microamp, respectively. The levels of these values are sufficiently low to preclude any electrical shock hazard in the event of a breakdown of the temperature sensing probe 26, such as a short circuit. The values indicated are not hazardous to human beings. When operating with other types of organism, higher or lower values of voltage and current may be chosen, as required.

The basic control for the heater 14 is provided by the controller 12 which takes the form of an alternating current trigger circuit, sometimes referred to as a trigac. In one embodiment of the invention, the AC trigger circuit 12 may be a uA742 AC trigger circuit which is available on the open market. The controller 12 functions both as a threshold detector and a trigger driver for the triac 16. As a threshold detector, it senses voltage level changes at its input terminals B and C. As a driver, it provides high energy pulses at its terminal A' for triggering the triac 16. Since the controller 12 is a zero crossing AC trigger, the trigger pulses at its terminal A' occur at the zero crossing at the load current. This therefore minimizes the generation of radio frequency interference. A controller device such as the AC trigger 12 requires an input bias current of approximately 10 microamperes. The bridge 28, is operating at approximately 10 microamperes. Therefore, the outputs of the bridge cannot be used to directly drive the controller 12. On the other hand, safety requires that the bridge circuit be operated at 10 microamps or less. In order to satisfy these two requirements, electronic isolation means between the bridge circuit 28 and the controller 12 has been provided. In a preferred embodiment, the isolation means takes the form of field effect transistors Q1 and Q2 connected as amplifiers. Such field effect transistors provide the necessary isolation between bridge circuit 28 and the controller 12 while at the same time raising controlling voltages to a level suitable for driving the AC trigger.

The drain terminal of field effect transistor Q1 is connected through resistor R7 to the supply voltage $V_B$. In a like manner, the drain terminal of field effect transistor Q2 is connected through the resistor R11 to the supply voltage $V_B$. Resistors R7 and R11 are drain resistors which function to establish the gain of each field effect transistor amplifier.

The thermistor leg of bridge 28 is connected through resistor R6 to the gate of field effect transistor Q1. The temperature setting leg of the bridge 28 is connected through resistor R12 to the gate of field effect transistor Q2. Resistors R6 and R12 serve to increase the circuit isolation between the bridge 28 and the controller 12. Capacitor C1 connects the gate of field effect transistor Q1 to ground, and capacitor C2 connects the gate of field effect transistor Q2 to ground, as shown. Capacitors C1 and C2 serve to shunt to ground any noise which may appear at the gates. Resistor R8 is connected to the source terminal of transistor Q1, and resistor R10 is connected to the source terminal of field effect transistor Q2. Source resistors R8 and R10 are connected in series with potentiometer R9. It is the function of source resistors R8 and R10, together with potentiometer R9 to establish the operating points for field effect transistors Q1 and Q2. Potentiometer R9 is adjusted so that when the bridge circuit 28 output voltages are equal, the voltages delivered at terminals B' and C' are sufficient to initiate the triggering function within the controller 12.

It is a function of the controller 12 to sense when the temperature measured at the thermistor 26 is below the temperature preset into the other leg of the bridge 28. Upon sensing such a low temperature, triggering pulses are generated at terminal A' and applied at terminal A of the primary of pulse transformer 18. This in turn triggers the triac 16. As a result, the heater 14 is turned on and supplies heat until the temperature senses by thermistor 26 is equal to the preset temperature.

As is well known, a thermistor is a resistor composed of a synthetic material having a high negative temperature coefficient of resistance. That is to say, its resistance decreases rapidly with rise of temperature. Since the resistance of thermistor 26 has a negative temperature coefficient, this means that the voltage level at the output of the thermistor leg of the bridge 28 is above the voltage level at the output of the preset control temperature leg of the bridge 28 whenever the temperature drops below the preselected temperature. The trigac circuit which forms the controller 12 generates trigger pulses at terminal A' whenever the input terminal C is positive with respect to the input terminal B. This constitutes the threshold detection level. Thus, if a signal from the thermistor leg of the bridge 28 is supplied to terminal B of controller 12 through field effect transistor Q1 and the signal from the preset control temperature leg is supplied to terminal C through field effect transistor Q2, trigger pulses are generated at terminal A'. These trigger pulses are coupled to terminal A of the primary of pulse transformer 18, thereby gating on triac 16. The purpose of pulse transformer 18 is to isolate controller 12 from the alternating current passing through heater 14.

Thus, control circuitry for turning on the heater 14 each time the temperature of the organism falls below the preset temperature has been provided. Moreover, the circuitry for controlling and operating the heater 14 is electronically isolated from the sensing circuitry in the manner explained above. Of course, those skilled in the art will recognize that other isolation circuits may be substituted for the field effect transistors employed herein.

As previously indicated, it is one of the purposes of the present invention to make the operation of the temperature sensing probe 25 and heater 14 as safe as possible.

The circuitry thus far described inherently provides protection against a short circuit in the temperature sensing probe 25. Such a short circuit necessarily results in a voltage at terminal B which is well below the voltage at terminal C. The controller 12 sees this as a very hot temperature sensed by the thermistor 26 and automatically shuts down the heater by removing the gating pulse from the triac 16.

An open circuit condition in the temperature sensing probe 25 presents a different problem. Such an open circuit results in a relatively high voltage in the thermistor leg of the bridge 28. Such a high voltage is amplified by the field effect transistor amplifier Q1 and sensed by the controller 12 as a very cold condition. Accordingly, the heater 14 would be kept on continuously. To protect against this situation, the gate of field effect transistor Q4 is connected through resistor R16 to the thermistor leg of bridge 28. Q4 is biased by appropriate resistors to respond to an abnormally high probe voltage, such as an open circuit. The response by field effect transistor Q4 takes the form of allowing current to flow in its source circuit through resistors R14 to the base of transistor Q3. The drain circuit of field effect transistor Q4 is connected to the supply voltage $V_B$ as shown. Resistor R15 is connected between the source circuit and ground. The function of resistor R15 is to provide self bias for field effect transistor Q4.

The emitter of transistor Q3 is connected to ground. The collector of transistor Q3 is connected through resistor R13 to relay 30, which in turn is connected to the supply voltage $V_B$. Resistor R13 limits the maximum collector current in transistor Q3. Resistor R16 cooperates with field effect transistor Q4 to further isolate the relay circuitry from the bridge 28. Capacitor C3 connects the gate of field effect transistor Q4 to ground and prevents unwanted noise from triggering the same. In operation, an overly large rise in voltage in the thermistor circuit results in additional current flow through resistor R14. This results in an increase in current in the collector circuit of transistor Q3 which activates the normally open relay contact 30'. The closing of relay contact 30' connects the gate of field effect transistor Q1 to ground. Such a connection simulates a short circuit condition, thereby shutting down the heater 14 as explained above. Field effect transistor Q4 isolates the open circuit control from bridge 28.

Although other forms of switching may be used, such as a semiconductor switch, a relay is preferred. The advantage of a relay rather than an electronic switch is that its impedance in the open position of relay contact 30' is several hundred megohms, which means that it does not load down the circuit.

To further insure safe operation of the circuit, an alarm circuit 32 has been provided. The alarm circuit 32 responds to the absolute value of the difference between the temperature sensed by the thermistor probe 26 and the preset temperature. Thus, if the probe temperature deviates more than a predetermined number of degrees in either direction from the preset temperature, an alarm is actuated.

The alarm circuit 32 includes two field effect transistors Q7 and Q8 which provide isolation from the bridge circuit 28 as well as suitable higher voltage inputs for operating the remainder of the circuit. The gate of field effect transistor Q7 is connected through resistor R27 to the thermistor leg of bridge 28. The gate of field effect transistor Q8 is connected through resistor 33 to the preset temperature leg of bridge 28. Capacitor C6 connects the gate of field effect transistor Q7 to ground. Capacitor C7 connects the gate of field effect transistor Q8 to ground. Capacitors C6 and C7 function to filter out noise in the same manner as capacitors C1 and C2.

The alarm circuit 32 includes a differential amplifier designated generally as 34. The differential amplifier 34 comprises transistors Q9 and Q10. As shown, the base of transistor Q9 is connected to the drain of field effect transistor Q7. In a like manner, the base of transistor Q10 is connected to the drain of field effect transistor Q8. The emitters of transistor Q9 and Q10 are each connected to the collector of transistor Q11. The base of transistor Q11 is connected to resistor R30 to supply voltage $V_B$. The base of transistor Q11 is also connected to series connected diodes D1 and D2 which are connected to ground potential. The emitter of transistor Q11 is connected through variable resistor R32 and fixed resistor R33 to ground. Transistor Q11, diodes D1 and D2, resistors R30 and R33, and variable resistor R32 provide a constant current source for the differential amplifier 34. Variable resistor R32 permits small adjustments in the range of the alarm circuit to compensate for variations in circuit gain. The source terminal of field effect transistor Q7 is connected through resistor R29 to the potentiometer R34. In a like manner, the source terminal of field effect transistor Q8 is connected through resistor R37 to the potentiometer R34. The potentiometer R34, which may be referred to as an alarm balance control, is adjusted so that at equal inputs to the bases of the transistors Q9 and Q10, the outputs at their respective collectors, designated as D and E, are equal. The respective collectors of transistors Q9 and Q10 are connected through resistors R31 and R35 to the supply voltage $V_B$.

Any change in the output levels of the differential amplifier 34, taken at the collector terminals D and E, is proportional to the difference between the input levels of the alarm circuit 32 derived from the legs of the bridge 28. These input levels are amplified by the isolating field effect transistors Q7 and Q8 to provide sufficient voltage levels. The differential amplifier provides a decreasing voltage level at each of its outputs D and E. Therefore, the absolute value of the difference between the inputs derived from the legs of the bridge 28 is detected.

The collector output terminals D and E are connected to terminals D' and E' respectively. Terminal D' is connected in series with variable resistor R39, resistor R40, resistor R41 and variable resistor R42. Variable resistor R42 is connected to ground. Similarly, terminal E' is connected in series with variable resistor R43, fixed resistor R44, fixed resistor R45, and variable resistor R46. Variable resistor R46 is connected to ground. The common junction between fixed resistors R40 and R41 is connected to the base of transistor Q12. The common connection between fixed resistor R44 and fixed resistor R45 is connected to the base of transistor Q13. Transistors Q12 and Q13 are connected back to back as shown. Thus, their commonly connected emitters are connected to the supply voltage $V_D$. Their commonly connected collectors are connected through capacitor C50 to ground. Capacitor C50 functions to filter out any unwanted noise. The commonly connected collectors of transistors Q12 and Q13 are also connected through resistor R80 to the base of transistor Q14. The collector of transistor Q14 is in turn connected to supply voltage $V_D$. The emitter of transistor Q14 is connected to the alarm 36. The other terminal of alarm 36 is connected through switch S2 to ground.

Transistors Q12 and Q13 provide a switching function. Thus, the two transistors will saturate whenever their base-emitter junctions become forward biased. That is, when either base voltage decreases below the emitter voltage by a predetermined amount, the collector voltage will rise toward the positive voltage supply level $V_D$. This rise in voltage turns on transistor Q14, thereby placing a voltage across the alarm 36. Alarm 36 is thereby actuated if switch S2 is closed. In the preferred embodiment of this invention, alarm 36 generates an audible signal when turned on. However, those skilled in the art will readily recognize that other types of alarms such as a light can be substituted.

From the foregoing, it should be apparent that when either output D or E of the differential amplifier 34 decreases from its quiescent level to a threshold level determined by resistors R39 and R43, transistors Q12 and Q13 are saturated (turned on) by the voltage dividers connected to their bases. As a result, the alarm 36 is actuated. The variable resistors R39 and R43 are set to a predetermined maximum temperature differential in the outputs of the leg of bridge circuit 28. Such a maximum temperature differential may, for example, have values between ± 0.5° F. and ± 1.5° F. Variable resistors R42 and R46 function to compensate for variations in the supply voltage $V_D$.

As an example of the operation of the alarm circuit 32, assume that the temperature set into one leg of the bridge circuit 28 is 98.6° F., and the variable resistors R39 and R43 have been set to permit a maximum temperature differential of ± 1° F. Therefore, the alarm 36 will be actuated if the thermistor probe temperature rises above 99.6° F. or falls below 97.6° F.

The apparatus 10 also includes circuitry for measuring the value of the temperature sensed by the probe 26. Such temperature measuring circuitry is designated generally as 38 and includes field effect transistors Q5 and Q6 which isolate the bridge 28 from the temperature measuring circuitry 38. As shown, the gate of field effect transistor Q5 is connected through resistor R17 to the switch S1. Switch S1 provides the means for connecting the temperature measuring circuit 38 either to the thermistor leg or to the temperature preset leg of the bridge circuit 28. The gate of transistor Q5 is connected through capacitor C4 to ground. Capacitor C4 filters out unwanted noise. For a similar reason, the gate of field effect transistor Q6 is connected through capacitor C5 to ground. The aforesaid gate is also connected through resistor R23 to the voltage divider consisting of fixed resistor R24, variable resistor R25, and fixed resistor R26, all connected in series between the supply voltage $V_C$ and ground.

The function of the field effect transistors Q5 and Q6 is to isolate and avoid loading down the bridge circuit 28. Switch S1 is normally positioned so as to be in circuit with the thermistor leg of the bridge circuit. However, it can be connected to read the temperature selected for the other leg.

The temperature measuring circuit 38 includes a microammeter 40 which is calibrated to indicate temperature by comparing either output voltage of the bridge circuit 28 with a reference voltage. The meter responds to a current proportional to the difference between the output voltage and the reference voltage. As shown, the meter 40 is connected in series with a variable resistor R20 which adjusts the meter's range. The meter 40 and variable resistor R20 are connected between the drain terminals of the field effect transistors Q5 and Q6. The drain terminal of transistor Q5 is connected through resistor R18 to the supply voltage $V_B$. The drain terminal of field effect transistor Q6 is connected through resistor R21 to the supply voltage $V_B$.

Resistors R24, R25 and R26 provide the aforementioned reference voltage to the gate of field effect transistor Q6. Variable resistor R26 is adjusted to provide zero deflection in the ammeter 40 when the thermistor 26 is at minimum temperature. The source resistors R19 and R22 establish the operating points of field effect transistors Q3 and Q4. Meter range variable resistor R20 is adjusted for full scale meter deflection when the thermistor 26 is at its maximum temperature. Resistors R18 and R21 fix the gain of the field effect transistor amplifiers.

From the foregoing, it should be apparent that the deflection of the needle in ammeter 40 is proportional to the preset voltage to gate of transistor Q6 and the voltage detected at the gate of field effect transistor Q5. Thus, the meter 40, when properly calibrated, is the measure of the temperature detected by thermistor probe 26, or the temperature set in the other leg of bridge 28.

From the foregoing, it should be apparent that a circuit for measuring, controlling and monitoring the temperature of a living organism has been provided. Each individual subcircuit derives its basic control from a bridge circuit which is isolated by field effect transistors, thereby permitting the temperature measuring probe to electronically monitor temperature without any hazard of electric shock.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for detecting temperature in vivo and controlling a heater in response to the detected temperature, comprising: a bridge circuit, temperature sensitive means connected in one leg of said bridge circuit, temperature selection means connected in another leg of said bridge circuit, a heater for applying heat to the organism whose temperature is being measured and controlled, switch means for controlling said heater, control means for actuating said switch means, said control means being responsive to a measured change in temperature to actuate said switch means, isolation means to electrically isolate said temperature sensitive means and said bridge circuit from said switch control means, whereby said temperature sensitive means and said bridge circuit may be operated at a low voltage that is not hazardous to the organism and the remainder of said circuit may use higher, suitable operating voltages, means to detect an open circuit condition in said temperature sensitive means, and an open circuit switch means responsive to said open circuit detection means, said open circuit switch means being effective to shut down said heater.

2. Apparatus for detecting temperature in vivo and controlling a heater in response to the detected temperature in accordance with claim 1 including temperature measuring means for directly measuring the temperature of said organism, and second isolation means to electronically isolate said temperature sensitive means and bridge circuit from said temperature measuring means, whereby said temperature sensitive means and said bridge circuit may be operated at a low voltage that is not hazardous to the organism and the temperature measuring means may be operated at a higher, suitable operating voltage.

3. Apparatus for detecting temperature in vivo and controlling a heater in response to the detected temperature in accordance with claim 1 wherein said isolation means includes at least one field effect transistor.

4. Apparatus for detecting temperature in vivo and controlling a heater in response to the detected temperature in accordance with claim 2 wherein said second isolation means includes a field effect transistor.

5. Apparatus for detecting temperature in vivo and controlling a heater in response to the detected temperature in accordance with claim 1 including an alarm circuit connected across said bridge circuit, said alarm circuit being responsive to a predetermined absolute value of variation in temperature from the temperature selected by said temperature selection means.

6. Apparatus for detecting temperature in vivo and controlling a heater in response to the detected temperature in accordance with claim 5 including third isolation means to electrically isolate said alarm circuit from said temperature sensitive means and bridge circuit, whereby said temperature sensitive means and bridge circuit may be operated at a low voltage that is not hazardous to the organism and the alarm circuit may use a higher, suitable operating voltage.

7. Apparatus for detecting temperature in vivo and controlling a heater in response to the detected temperature in accordance with claim 6 wherein said third isolation means includes a field effect transistor.

* * * * *